United States Patent [19]

Bentrup

[11] Patent Number: 4,923,175
[45] Date of Patent: May 8, 1990

[54] CONSTANT MESH GEAR BOX LANDING GEAR

[75] Inventor: Otto T. Bentrup, Rockford, Ill.

[73] Assignee: Kysor Industrial Corporation, Cadillac, Mich.

[21] Appl. No.: 354,032

[22] Filed: May 19, 1989

[51] Int. Cl.⁵ .............................................. B60S 9/02
[52] U.S. Cl. ................................. 254/419; 254/425
[58] Field of Search ...... 74/665 G, 665 GA, 665 GB, 74/665 GC; 280/766.1; 254/419, 103, 425

[56] References Cited

U.S. PATENT DOCUMENTS

| | | |
|---|---|---|
| 313,711 | 3/1910 | Corser . |
| 735,012 | 7/1903 | Barnes . |
| 1,066,764 | 7/1913 | Smith . |
| 1,239,111 | 9/1917 | Knutson . |
| 1,664,303 | 3/1928 | Mayer . |
| 2,499,625 | 3/1950 | Black .................................. 254/419 |
| 2,807,965 | 10/1957 | Frank . |
| 3,182,956 | 5/1965 | Dalton ................................ 254/419 |

Primary Examiner—Robert C. Watson
Attorney, Agent, or Firm—Price, Heneveld, Cooper, DeWitt & Litton

[57] ABSTRACT

A gear box trailer support having axially fixed gears in the gear box, including axially fixed larger and smaller input means on an input shaft, and axially fixed smaller and larger output gear elements of a gear cluster on the output cross shaft to the bevel gear drive for the elevating screw in the telescopic leg subassembly. The input gears are in constant engagement with their mating respective output gears. Shifting between high speed low torque output and low speed high torque output is achieved by axial movement of the input shaft within and relative to the hubs of the input gears. This input shaft has a male transverse drive pin which selectively engages cooperative transverse female sloped wall drive slots in the facing inner axial ends of the axially fixed input gears.

17 Claims, 2 Drawing Sheets

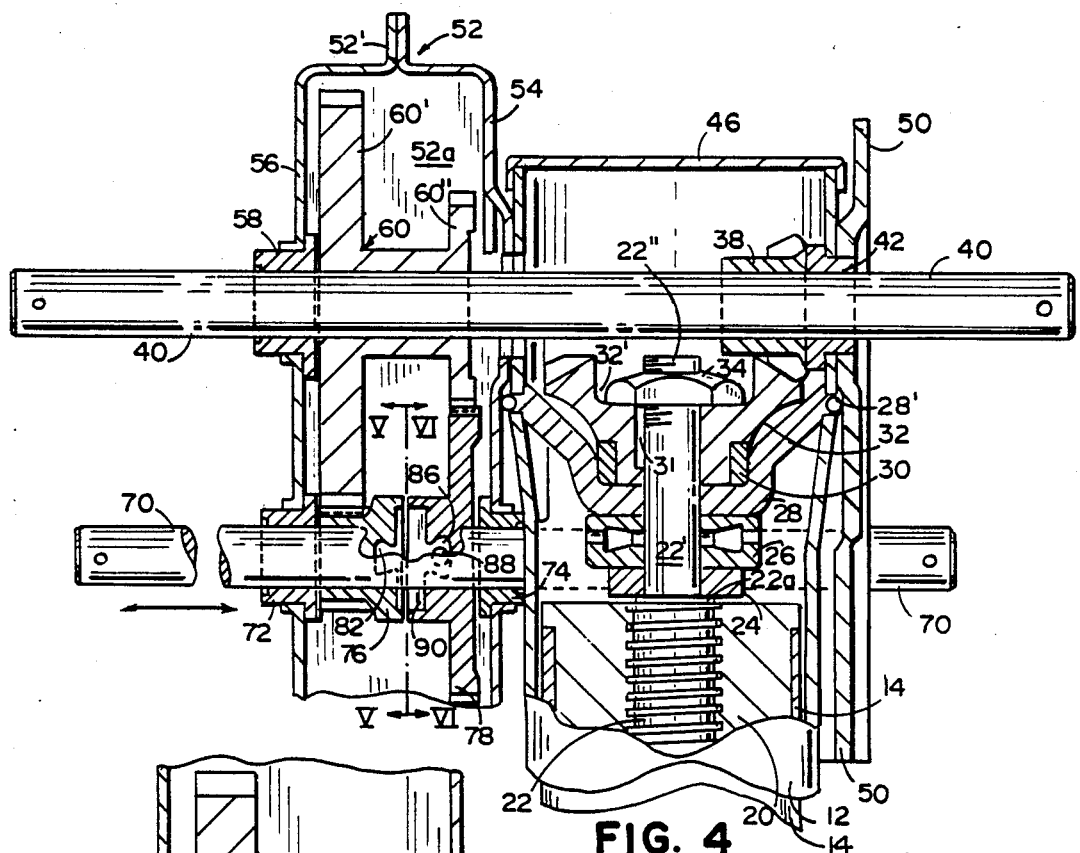
FIG. 4
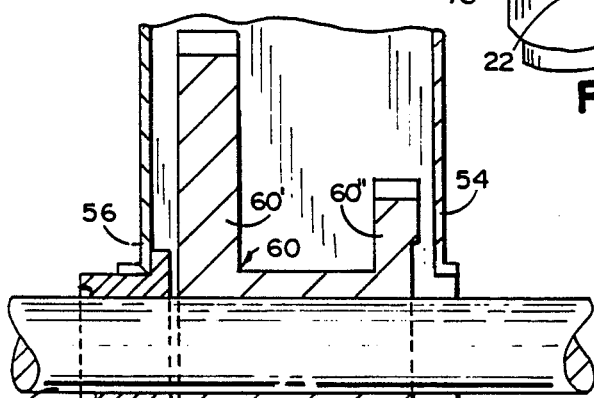
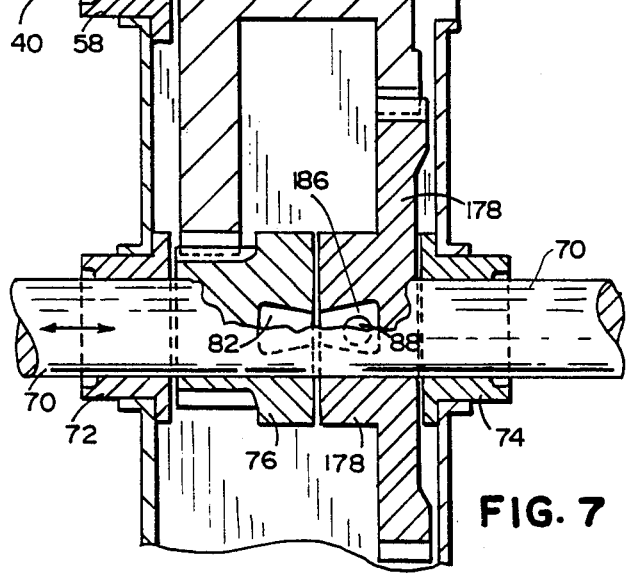
FIG. 7
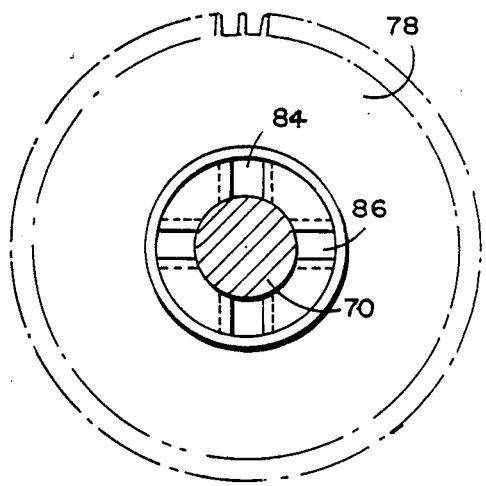
FIG. 5
FIG. 6

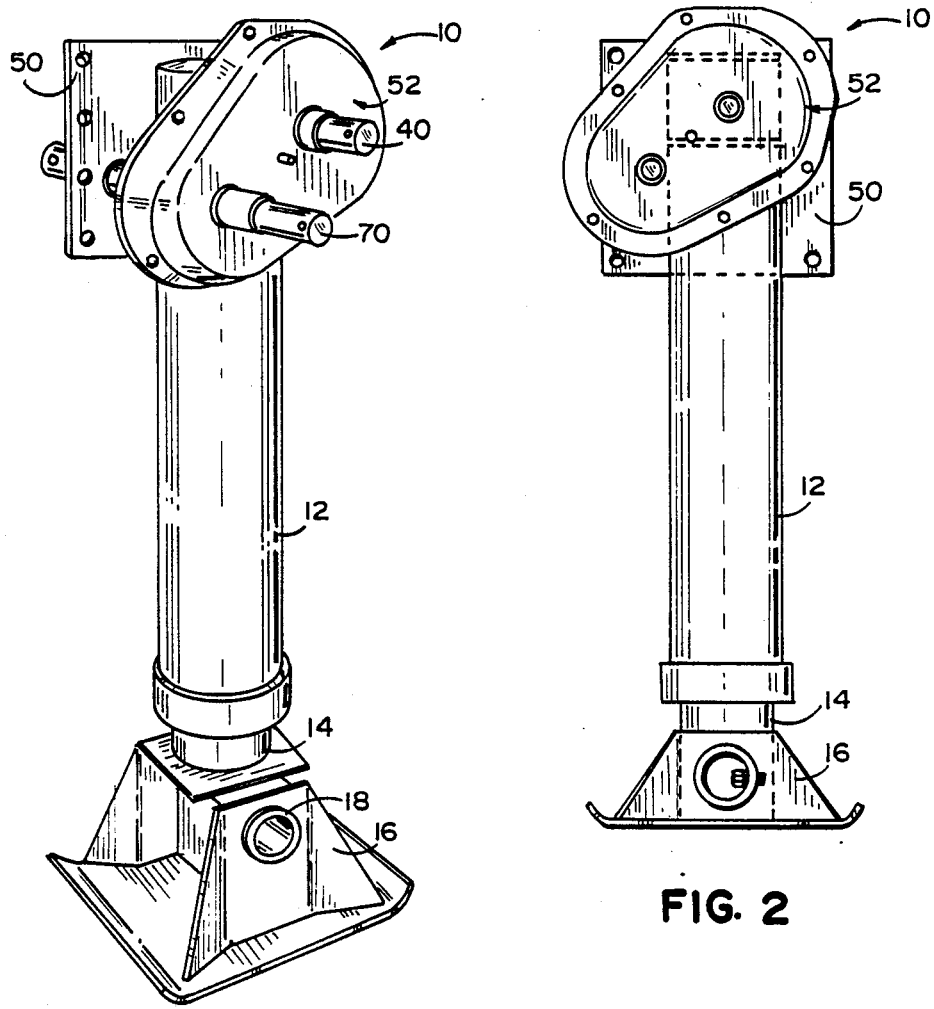
FIG. 1
FIG. 2
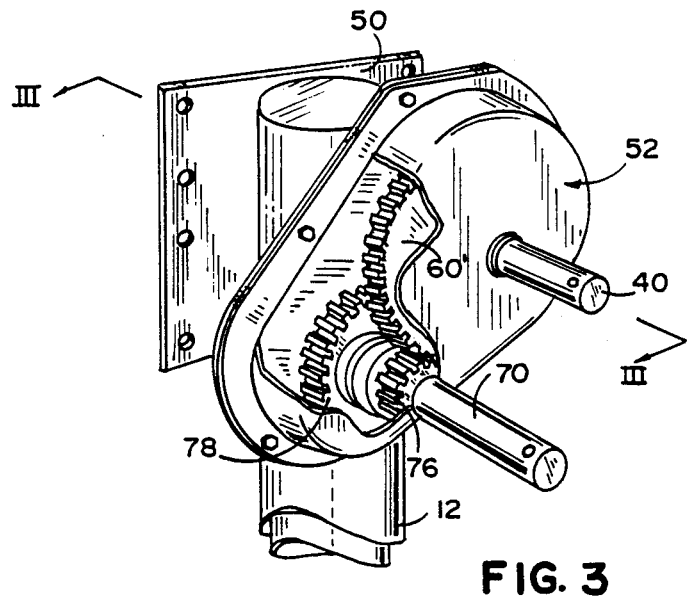
FIG. 3

4,923,175

CONSTANT MESH GEAR BOX LANDING GEAR

BACKGROUND OF THE INVENTION

This application relates to a gear box trailer support. A trailer support with a two-speed gear box provides a mechanism for raising or lowering a loaded trailer using a low gear ratio which has high mechanical advantage but a relatively slow speed, or raising or lowering of an unloaded trailer, for example, using a high gear ratio, which provides faster speed with lower mechanical advantage.

The two-speed gear box of conventional design effects the change between low and high ratio by axially sliding the input crank shaft manually to shift the input gear cluster attached thereto inside the gear box. Shifting this gear cluster in one direction or the other alternatively engages and disengages alternate sets of gears. This axial shifting action is made difficult by several factors: 1) there is normally a detent mechanism employed to hold the gear/shaft assembly in the desired position, so that the restraining force of the detent must be overcome in order to shift the gears; and 2) the internal parts of the gear box are normally lubricated with grease which is typically very viscous, and more so in cold weather. Because the gears of the cluster are moved during the shifting action, it is necessary for the gears to displace a quantity of grease to change position from side to side in the gear box. This produces a condition of very difficult gear shifting in cold weather and/or when the gear box is overfilled with grease.

In addition, the shifting gear cluster also imposes constraints on the gear box itself. That is, the substantial width of the gear box is dictated not just by the space required for the gears but also the added space required to shift the gears. Preferably, one set of gears must be fully disengaged before the second set can be engaged. This requires more width and results in essentially empty space inside the gear box.

SUMMARY OF THE INVENTION

The proposed invention involves gears arranged in a constant-mesh condition. That is, the gears are not shifted in order to change gear ratios. All gears remain constantly meshed with their respective mating gears. To effect a change of gear ratios, only the input shaft is axially moved. The input shaft engages the desired gear by means of a transverse drive pin arranged radially through the shaft. This pin engages slot-like recesses in the hub of the desired gear. There may be provided a clearance space between the gear hubs to permit the pin to disengage from one gear and then be positioned by shaft rotation to engage recesses in the opposite gear. This apparatus eliminates the problems enumerated with the present art which must move the entire gear cluster from side to side to change gear ratios.

A further advantage of this invention is the capability of eliminating the known detent mechanism to hold the gears in engagement. In the instant invention, the slots in the gear hubs which engage the driving pin have angled sides which cause the pin to be drawn into and securely retained in the engaged slot recesses when the shaft is rotated to crank the landing gear up or down.

The elimination of the detent mechanism and the need to move the gear cluster makes this invention very easy to shift from one ratio position to the other. The only force required for shifting is that required to slide the input shaft within its bearings and through the gear hub central bores.

If a gear box of standard width is used for this invention with constant mesh gears, there is space available to permit the use of gears with increased face width. This can be desirable to increase the life of the gears by increasing their contacting gear surface areas. This also enables the possibility of constructing the gears from nonmetallic materials which normally require greater contact area for adequate life.

These and other objects, advantages and features of the invention will be more apparent upon studying the following specification in conjunction with the drawings.

BRIEF DESCRIPTION OF THE DRAWINGS

FIG. 1 is a perspective view of one leg subassembly and gear box subassembly of the novel landing gear or trailer support of this invention;

FIG. 2 is a side elevational view of the trailer support in FIG. 1;

FIG. 3 is an enlarged perspective cutaway view of a portion of the gear box in the assembly of FIGS. 1 and 2;

FIG. 4 is an enlarged sectional fragmentary view of the top of the gear, box and leg assembly taken on plane III—III of FIG. 3;

FIG. 5 is an elevational view taken on plane V—V in FIG. 4;

FIG. 6 is an elevational view taken on plane VI—VI in FIG. 4; and

FIG. 7 is a fragmentary sectional enlarged view of a second embodiment of the gear box components.

DESCRIPTION OF THE PREFERRED EMBODIMENT

Referring to FIG. 1, the landing gear or trailer support assembly 10 there depicted includes certain conventional components, namely upper leg 12, lower leg 14, and foot or ground member 16, all connected to a gear box subassembly at the upper end of the upper leg. Foot 16 is connected to the lower end of lower leg 14, preferably by a swivel pin type of arrangement 18 in conventional fashion. Lower leg 14 is a hollow cylindrical member telescopically received within hollow cylindrical upper leg 12. In the upper end of lower leg 14 is fixed a nut 20 having a central threaded orifice therethrough (FIG. 4) receiving a like threaded screw shaft forming a vertical elevating screw 22. In FIG. 4, the telescopic double leg assembly is illustrated in its most compact condition, i.e. with the legs fully telescoped together, so that nut 20 is at its maximum height within outer leg 12. Elevating screw 22 has a reduced diameter, integral stud 22′ projecting upwardly at its upper end and terminating in exterior threads 22″. At the lower end of this stud 22′ and at the upper end of the operating threads for this shaft is a shoulder 22a upon which an annular collar 24 bears. Resting on this collar is a thrust bearing 26, basically annular in configuration, to be mounted on stud 22′. A configurated base plate 28 rests on bearing 26. Base plate 28 has an upwardly open dish type configuration, including a central axial orifice fitting around stud 22′ defining a cylindrical cavity which receives annular bushing 30. Base plate 28 has protrusions 28′ which fit into cooperative openings within the upper end of upper leg 12 to secure the base plate axially and circumferentially therein. Bushing 30 receives the hub of a bevel gear 32 which also fits around stud 22' and is keyed thereto by a key 31. Collar 24, thrust bearing 26, base plate 28 and bevel gear 32 are held on this stud at the upper end of the screw shaft by a nut 34 threaded onto threads 20" and engaging the upper shoulder surface of an axial concavity 32' of bevel gear 32. These members are all contained within the upper end of hollow upper leg 12. Engaging the upwardly outwardly facing teeth of bevel gear 32 are the downwardly and laterally oriented teeth of a cooperative bevel pinion 38 of smaller diameter than bevel gear 32. It is also within leg 12. The bevel pinion is pinned to shaft 40. Thus, it is fixedly mounted, axially and circumferentially, on cross shaft 40. Cross shaft 40 extends through the upper end of upper leg 12, being mounted in flanged bushing 42 which is pressed into position in leg 12, and in bushing 58 which is mounted in the outer shell of the gear box (to be described) in alignment with bushing 42. The upper open end of upper leg 12 is closed by cap 46. A conventional vertical mounting flange plate 50 is welded to the upper leg subassembly for attachment of the complete trailer support to the trailer (not shown).

Shaft 40 also extends through the gear box 52. This gear box is composed of an inner half shell 54 welded to upper leg 12, and an outer half shell 56 bolted to the inner half shell at the outer peripheral flanges 52'. This encloses the gear box space 52a. Flanged bushing 58 is press fit into the outer half shell 56 of the gear box. Shaft 40 extends through bushings 58 and 42. The inner end of shaft 40 (i.e., the right end as viewed in FIG. 4) may extend to, or be coupled with, the second leg subassembly (not shown) forming the other part of the landing gear or trailer support set. Such other leg subassembly is conventional in structure, not including a gear box but including the components within the depicted leg subassembly, in mirror image thereto. Thus, these details are not repeated.

Mounted on shaft 40 within gear box 52 is output gear cluster 60 pinned to shaft 40 to axially fix it thereto and rotate therewith. Gear cluster 60, shaft 40 and bevel pinion 38 are axially fixed in position. This is achieved by fixed bushing 58 adjacent the outer face of gear cluster 60 and by fixed bushing 42 adjacent the opposite outer face of bevel pinion 38 Bushings 58 and 42 thus straddle these components and are spaced therefrom by only thousandths of an inch. That is, bushing 42 is thousandths of an inch from the outer face of bevel pinion 38 and bushing 58 is thousandths of an inch from the opposite outer face of gear cluster 60. Gear cluster 60 has a larger diameter spur gear element 60', a smaller diameter spur gear element 60" spaced from gear element 60', and an integral collar therebetween.

A second shaft, namely input shaft 70, also extends through gear box 52, at a lower elevation, and is mounted to the gear box by a pair of spaced, aligned flanged bushings 72 and 74 press fit into aligned openings in the outer and inner half shells 56 and 54 respectively. Rotationally fixed on shaft 70 is a small diameter input spur gear 76 which engages larger diameter output gear element 60'. Also circumferentially mounted on shaft 70 is a larger diameter spur gear 78 engaging smaller diameter output gear element 60". The engagement of gear 76 with gear element 60', and of gear 78 with gear element 60" is constant, these gears never being taken out of engagement with each other. Gears 76 and 78 are adjacent each other in the gear box, being axially retained in one position on shaft 70. Bushings 72 and 74 are closely spaced just thousandths of an inch from, and adjacent to, the outer axial end faces of gears 76 and 78. This retains them against outward axial movement. The axial inner faces of gears 76 and 78 are closely adjacent to each other a small fraction of an inch, preferably just thousandths of an inch, such that the two end faces prevent inward axial movement of either gear within the gear box. Thus the two bushings and the close relationship between the two gears retain them axially fixed.

The axial inner end faces of gears 76 and 78 have female recess drive means, namely radial drive slots or sockets 80 and 82 (FIGS. 4, 5 and 6) in gear 76, and drive slots 84 and 86 in gear 78. These slots selectively receive the outer radially extending ends of a cooperative male drive means, namely a projection drive pin 88 (FIG. 4) which is preferably press fit through an opening in shaft 70 to protrude from opposite sides of the periphery of shaft 70 to straddle it. Each pair of slots, e.g. 80, is also astraddle of shaft 70. Two sets of slots are depicted for each gear for ease of interconnection. The slots each have a dovetail type configuration, i.e. with a smaller width at the end face and a greater width in the depth of the slot. The smaller width is greater than the diameter of drive pin 88. The sloped walls of these slots cause the pin, when rotated by shaft 70, to be cammed into the deepest portion of the slots for secure driving interrelationship between the shaft and the respective gear with which the pin is engaged.

Shaft 70 can be shifted axially as depicted by the arrows in FIG. 4, to shift the drive pin from a set of slots in one gear to a set of slots in the other gear. A typical hand crank (not shown) is attached to the outer end of input shaft 70. The shaft can be easily shifted axially by pushing or pulling on the crank.

In the embodiment depicted in FIG. 4, there is also a neutral position for the drive pin, between the two gears, so that shaft 70 can be freely rotated without driving either gear. Space 90 is depicted as provided in the inner end face of gear 78. This space has a width greater than the diameter of drive pin 88 and has a diameter greater than the overall length of drive pin 88, so that by shifting shaft 70 axially to move pin 88 into this neutral space, the shaft and pin can be rotated without driving either gear. This space could alternatively have portions thereof in the end faces of both gears.

In FIG. 7 is disclosed an alternative embodiment with no neutral position. That is, gear 178 has drive slots 186 therein, but no enlarged cavity forming a neutral space (90). Thus, shifting of shaft 70 and drive pin 188 axially will cause the drive pin to engage either gear 178 or gear 76, to alternately enable drive of one gear or the other gear.

The novel apparatus, once understood, comprises a very simple trailer support mechanism. Its structural simplicity is a significant advantage, particularly in view of the improved operational characteristics resulting. Operation of the apparatus to raise or lower a heavy load at higher torque, or a light load on the trailer at higher speed, is readily achieved. Specifically, the crank on the outer end of shaft 70 is pulled or pushed to easily axially shift shaft 70 to cause drive pin 88 thereon to engage either gear 76 or 78 (or 76 or 178 in the alternative embodiment) as desired. To elevate a heavy load, pin 88 is shifted by shaft 70 into the slots of axially fixed, smaller diameter, low speed, input gear 76 by pulling on shaft 70, the pin being cammed into the deepest portion of the slot when rotational pressure is applied by the crank. Rotation of the crank thus drives shaft 70, pin 88 and gear 76, which rotates larger diameter gear element 60' of gear cluster 60, to rotationally drive cross shaft 40 which rotates bevel pinion 38 and thus bevel gear 32 which it engages, thereby rotating elevating screw 22 within fixed nut 20 to lower lower leg 14 out of upper leg 12, i.e. to telescopically expand these legs. Similarly, lowering of the trailer is achieved by rotating the crank in the opposite direction.

If it is desired to raise or lower a lighter load on the trailer at a more rapid pace, shaft 70 is pushed axially to shift it for causing drive pin 88 to engage slots or sockets 86 in gear 78 as shown in FIG. 4, then rotating the crank causing pin 88 to drive larger diameter, high speed, input gear 78 which in turn drives smaller diameter gear element 60" on gear cluster 60 to rotate shaft 40, thereby driving the bevel pinion and bevel gear at a greater rate.

With the embodiment in FIG. 4, if it is desired to move the crank to a neutral position, shaft 70 is slid until pin 88 is in neutral space 90 such that rotation of the shaft will not cause raising or lowering. In contrast, in the embodiment of FIG. 7, movement of the shaft will cause either engagement of one gear or the other with no neutral space.

Axial shifting of shaft 70 is readily done since only it moves, with the gears being constantly axially fixed so that a quantity of grease need not be shifted along with a gear cluster as in prior devices. The gear box can be considerably narrower than usual. Moreover, if the conventional width gear box is employed, the actual gears can be of substantially greater tooth width than previously possible, thereby providing longer service life to the gears. Further, this creates the possibility of the use of nonmetallic gears since the substantially increased width provides strength to the gear teeth.

Conceivably those skilled in this art will readily see various modifications or detail changes which can be made to suit a particular type of installation. Hence, the invention is intended to be limited only by the scope of the appended claims and the reasonable equivalents thereto, rather than to the specific embodiments set forth to illustrate the preferred embodiments of the invention.

The embodiments of the invention in which an exclusive property or privilege is claimed are defined as follows.

1. A trailer support comprising:
a foot and a telescopic leg assembly thereon;
a vertical elevating screw assembly in said telescopic leg assembly;
a gear box attached to said leg assembly;
a bevel gear on the upper end of said elevating screw assembly;
a cross shaft having a bevel pinion affixed thereto, said bevel pinion engaging said bevel gear;
said cross shaft extending across said gear box;
a slidable input shaft extending into said gear box;
a smaller diameter, low speed, input gear in said gear box, having a sliding axial fit on said input shaft;
a larger diameter, high speed, input gear in said gear box, having a sliding axial fit on said input shaft;
said input gears being axially end-to-end to each other, and having facing adjacent axial ends, said input shaft extending through both said adjacent axial ends;
means for axially retaining said high speed and low speed input gears in one axial position in said gear box;
first and second transverse drive slots in the respective ones of said adjacent axial ends;
transverse drive pin means extending from said input shaft and engageable alternatively with said first and second drive slots for alternate connection with said low speed and high speed input gears by axial shifting of said input shaft relative to said input gears;
an output gear cluster fixed to said cross shaft, located in said gear box, and including a larger diameter gear element and a smaller diameter gear element;
means for retaining said output gear cluster in one axial position in said gear box;
said larger diameter gear element being in constant engagement with said low speed input gear, and said smaller diameter gear element being in constant engagement with said high speed input gear, whereby said telescopic leg assembly and foot can alternatively be elevated or lowered at high speed or low speed by shifting said input shaft and drive pin relative to said axially stationary input gears.

2. The trailer support in claim 1 wherein:
said transverse drive slots are astraddle of said input shaft and have sloped camming walls for camming said drive pin means into secure drive relationship therein.

3. The trailer support in claim 1 wherein:
said transverse drive slots have sloped side walls to form a dovetail type configuration, with the narrowest portion thereof being at said axial end and being greater in width than the width of said drive pin.

4. A trailer support comprising:
a foot and a telescopic leg assembly thereon;
a vertical elevating screw assembly in said telescopic leg assembly;
a gear box attached to said leg assembly;
a bevel gear on the upper end of said elevating screw assembly;
a cross shaft having a bevel pinion affixed thereto, said bevel pinion engaging said bevel gear;
said cross shaft extending across said gear box;
a slidable input shaft extending into said gear box;
a smaller diameter, low speed, input gear in said gear box, having a sliding axial fit on said input shaft;
a larger diameter, high speed, input gear in said gear box, having a sliding axial fit on said input shaft;
said input gears being axially end-to-end to each other, and having facing adjacent axial ends, said input shaft extending through both said adjacent axial ends;
means for axially retaining said high speed and low speed input gears in one axial position in said gear box;
first and second transverse drive slots in the respective ones of said adjacent axial ends;
transverse drive pin means extending from said input shaft and engageable alternatively with said first and second drive slots for alternate connection with said low speed and high speed input gears by axial shifting of said input shaft relative to said input gears;
an output gear cluster fixed to said cross shaft, located in said gear box, and including a larger diameter gear element and a smaller diameter gear element;

means for retaining said output gear cluster in one axial position in said gear box;

said larger diameter gear element being in constant engagement with said low speed input gear, and said smaller diameter gear element being in constant engagement with said high speed input gear, whereby said telescopic leg assembly and foot can alternatively be elevated or lowered at high speed or low speed by shifting said input shaft and drive pin relative to said axially stationary input gears;

said means for retaining said high speed and low speed input gears in one axial position comprising bearing surfaces.

5. The trailer support in claim 4 wherein said bearing surfaces comprise bearings astraddle said input gears, and said retaining means also includes said end-to-end relationship of said input gears.

6. A trailer support comprising:
a foot and a telescopic leg assembly thereon;
a vertical elevating screw assembly in said telescopic leg assembly;
a gear box attached to said leg assembly;
a bevel gear on the upper end of said elevating screw assembly;
a cross shaft having a bevel pinion affixed thereto, said bevel pinion engaging said bevel gear;
said cross shaft extending across said gear box;
a slidable input shaft extending into said gear box;
a smaller diameter, low speed, input gear in said gear box, having a sliding axial fit on said input shaft;
a larger diameter, high speed, input gear in said gear box, having a sliding axial fit on said input shaft;
said input gears being axially end-to-end to each other, and having facing adjacent axial ends, said input shaft extending through both said adjacent axial ends;
means for axially retaining said high speed and low speed input gears in one axial position in said gear box;
first and second transverse drive slots in the respective ones of said adjacent axial ends;
transverse drive pin means extending from said input shaft and engageable alternatively with said first and second drive slots for alternate connection with said low speed and high speed input gears by axial shifting of said input shaft relative to said input gears;
an output gear cluster fixed to said cross shaft, located in said gear box, and including a larger diameter gear element and a smaller diameter gear element;
means for retaining said output gear cluster in one axial position in said gear box;
said larger diameter gear element being in constant engagement with said low speed input gear, and said smaller diameter gear element being in constant engagement with said high speed input gear, whereby said telescopic leg assembly and foot can alternatively be elevated or lowered at high speed or low speed by shifting said input shaft and drive pin relative to said axially stationary input gears;
said facing ends of said input gears defining a space between said drive slots in said respective gears, said space having a width greater than the width of said drive pin means and having a diameter greater than the length of said drive pin means to form a neutral zone wherein said drive pin means is disconnected from both of said input gears.

7. A trailer support comprising:
foot and a telescopic leg assembly thereon;
a vertical elevating screw assembly in said telescopic leg assembly;
a gear box attached to said leg assembly;
a bevel gear on the upper end of said elevating screw assembly in said gear box;
a cross shaft having a bevel pinion affixed thereto, said bevel pinion engaging said bevel gear;
a slidable input shaft extending into said gear box;
a smaller diameter, low speed, input gear in said gear box, having a sliding axial fit on said input shaft;
a larger diameter, high speed, input gear in said gear box, having a sliding axial fit on said input shaft;
said input gears being axially end-to-end to each other to have facing axial ends;
means for axially retaining said high speed and low speed input gears in one axial position in said gear box;
first and second drive means for the respective ones of said input gears;
cooperative drive means for said input shaft engageable alternatively with said first and second drive means, for alternate connection with said low speed and high speed input gears by axial shifting of said input shaft relative to said input gears;
an output gear cluster mounted on and fixed to said cross shaft, located in said gear box, and including a larger diameter gear element and a smaller diameter gear element;
means for retaining said output gear cluster in one axial position in said gear box;
said larger diameter gear element being in constant engagement with said low speed input gear, and said smaller diameter gear element being in constant engagement with said high speed input gear;
whereby said telescopic leg assembly and foot can alternatively be elevated or lowered at high speed or low speed by shifting said input shaft and cooperative drive means relative to said axially stationary input gears.

8. A trailer support comprising:
a foot and a telescopic leg assembly thereon;
a vertical elevating screw assembly in said telescopic leg assembly;
a gear box attached to said leg assembly;
a bevel gear on the upper end of said elevating screw assembly in said gear box;
a cross shaft having a bevel pinion affixed thereto, said bevel pinion engaging said bevel gear;
a slidable input shaft extending into said gear box;
a smaller diameter, low speed, input gear in said gear box, having a sliding axial fit on said input shaft;
a larger diameter, high speed, input gear in said gear box, having a sliding axial fit on said input shaft;
said input gears being axially end-to-end to each other to have facing axial ends;
means for axially retaining said high speed and low speed input gears in one axial position in said gear box;
first and second drive means for the respective ones of said input gears;
cooperative drive means for said input shaft engageable alternatively with said first and second drive means, for alternate connection with said low speed and high speed input gears by axial shifting of said input shaft relative to said input gears;

an output gear cluster mounted on and fixed to said cross shaft, located in said gear box, and including a larger diameter gear element and a smaller diameter gear element;

means for retaining said output gear cluster in one axial position in said gear box;

said larger diameter gear element being in constant engagement with said low speed input gear, and said smaller diameter gear element being in constant engagement with said high speed input gear;

whereby said telescopic leg assembly and foot can alternatively be elevated or lowered at high speed or low speed by shifting said input shaft and cooperative drive means relative to said axially stationary input gears;

said first and second drive means comprising female recess drive means astraddle said input shaft; and said cooperative drive means comprising transverse male drive means axially alignable with and engageable with said female recess drive means.

9. The trailer support in claim 8 wherein:

said female recess drive means comprises transverse drive slots having sloped side walls to form a dovetail-like configuration, the narrowest portion thereof being greater in width than the width of said male drive means.

10. A trailer support comprising:

a foot and a telescopic leg assembly thereon;

a vertical elevating screw assembly in said telescopic leg assembly;

a gear box attached to said leg assembly;

a bevel gear on the upper end of said elevating screw assembly in said gear box;

a cross shaft having a bevel pinion affixed thereto, said bevel pinion engaging said bevel gear;

a slidable input shaft extending into said gear box;

a smaller diameter, low speed, input gear in said gear box, having a sliding axial fit on said input shaft;

a larger diameter, high speed, input gear in said gear box, having a sliding axial fit on said input shaft;

said input gears being axially end-to-end to each other to have facing axial ends;

means for axially retaining said high speed and low speed input gears in one axial position in said gear box;

first and second drive means for the respective ones of said input gears;

cooperative drive means for said input shaft engageable alternatively with said first and second drive means, for alternate connection with said low speed and high speed input gears by axial shifting of said input shaft relative to said input gears;

an output gear cluster mounted on and fixed to said cross shaft, located in said gear box, and including a larger diameter gear element and a smaller diameter gear element;

means for retaining said output gear cluster in one axial position in said gear box;

said larger diameter gear element being in constant engagement with said low speed input gear, and said smaller diameter gear element being in constant engagement with said high speed input gear;

whereby said telescopic leg assembly and foot can alternatively be elevated or lowered at high speed or low speed by shifting said input shaft and cooperative drive means relative to said axially stationary input gears;

said means for retaining said high speed and low speed input gears in open axial position comprising bearing surfaces.

11. The trailer support in claim 10 wherein said bearing surfaces comprise bearings astraddle said input gears, and said retaining means also includes said end-to-end relationship of said input gears.

12. The trailer support in claim 8 wherein:

said facing axial ends of said input gears define a neutral space between said drive slots in said respective gears, said neutral space having a width greater than the width of said transverse male drive means and having a diameter greater than the length of said transverse male drive means to form a neutral zone for causing said transverse male drive means to be disconnected from both said input gears.

13. A trailer support comprising:

a foot and leg assembly;

a vertical elevating assembly for said leg assembly;

a gear box attached to said leg assembly;

a gear drive to said elevating assembly;

a cross shaft to said gear drive;

a slidable input shaft extending into said gear box;

a smaller diameter, low speed, input gear in said gear box having a sliding axial fit on said input shaft;

a larger diameter, high speed, input gear in said gear box, having a sliding axial fit on said input shaft;

said input gears being axially end-to-end to each other to have facing axial ends;

means for axially retaining said high speed and low speed input gears in one axial position in said gear box;

first and second drive means for the respective ones of said input gears;

cooperative drive means for said input shaft engageable alternatively with said first and second drive means, for alternate connection with said low speed and high speed input gears by axial shifting of said input shaft relative to said input gears;

an output gear cluster mounted on and fixed to said cross shaft, located in said gear box, and including a larger diameter gear element and a smaller diameter gear element;

means for retaining said output gear cluster in one axial position in said gear box;

said larger diameter gear element being in constant engagement with said low speed input gear, and said smaller diameter gear element being in constant engagement with said high speed input gear;

whereby said telescopic leg assembly and foot can alternatively be elevated o lowered at high speed or low speed by shifting said input shaft and cooperative drive means relative to said axially stationary input gears.

14. A trailer support comprising:

a foot and leg assembly;

a vertical elevating assembly for said leg assembly;

a gear box attached to said leg assembly;

a gear drive to said elevating assembly;

a cross shaft to said gear drive;

a slidable input shaft extending into said gear box;

a smaller diameter, low speed, input gear in said gear box having a sliding axial fit on said input shaft;

a larger diameter, high speed, input gear in said gear box, having a sliding axial fit on said input shaft;

said input gears being axially end-to-end to each other to have facing axial ends;

means for axially retaining said high speed and low speed input gears in one axial position in said gear box;

first and second drive means for the respective ones of said input gears;

cooperative drive means for said input shaft engageable alternatively with said first and second drive means, for alternate connection with said low speed and high speed input gears by axial shifting of said input shaft relative to said input gears;

an output gear cluster mounted on and fixed to said cross shaft, located in said gear box, and including a larger diameter gear element and a smaller diameter gear element;

means for retaining said output gear cluster in one axial position in said gear box;

said larger diameter gear element being in constant engagement with said low speed input gear, and said smaller diameter gear element being in constant engagement with said high speed input gear;

whereby said telescopic leg assembly and foot can alternatively be elevated or lowered at high speed or low speed by lifting said input shaft and cooperative drive means relative to said axially stationary input gears;

said first and second drive means comprising female recess drive means astraddle said input shaft; and said cooperative drive means comprising transverse male drive means axially alignable with and engageable with said female recess drive means.

15. The trailer support in claim 14 wherein:

said female recess drive means comprises transverse drive slots having sloped side walls to form a dovetail-like configuration, the narrowest portion thereof being greater in width than the width of said male drive means.

16. A trailer support comprising:
a foot and leg assembly;
a vertical elevating assembly for said leg assembly;
a gear box attached to said leg assembly;
a gear drive to said elevating assembly;
a cross shaft to said gear drive;
a slidable input shaft extending into said gear box;
a smaller diameter, low speed, input gear in said gear box having a sliding axial fit on said input shaft;
a larger diameter, high speed, input gear in said gear box, having a sliding axial fit on said input shaft;
said input gears being axially end-to-end to each other to have facing axial ends;
means for axially retaining said high speed and low speed input gears in one axial position in said gear box;
first and second drive means for the respective ones of said input gears;
cooperative drive means for said input shaft engageable alternatively with said first and second drive means, for alternate connection with said low speed and high speed input gears by axial shifting of said input shaft relative to said input gears;
an output gear cluster mounted on and fixed to said cross shaft, located in said gear box, and including a larger diameter gear element and a smaller diameter gear element;
means for retaining said output gear cluster in one axial position in said gear box;
said larger diameter gear element being in constant engagement with said low speed input gear, and said smaller diameter gear element being in constant engagement with said high speed input gear;
whereby said telescopic leg assembly and foot can alternatively be elevated or lowered at high speed or low speed by shifting said input shaft and cooperative drive means relative to said axially stationary input gears;
said means for retaining said high speed and low speed input gears in one axial position comprising bearing surfaces.

17. The trailer support in claim 16 wherein said bearing surfaces comprise bearings astraddle said input gears, and said retaining means also includes said end-to-end relationship of said input gears.

* * * * *

UNITED STATES PATENT AND TRADEMARK OFFICE
CERTIFICATE OF CORRECTION

PATENT NO. : 4,923,175

DATED : May 8, 1990

INVENTOR(S) : Otto T. Bentrup

It is certified that error appears in the above-identified patent and that said Letters Patent is hereby corrected as shown below:

Column 3, Line 44;

After the numeral "38" insert -- . (period --;

Column 10, Claim 10, Line 2;

"open" should be -- one --;

Column 10, Claim 13, Line 52;

"o" should be -- or --;

Column 11, Claim 14, Line 23;

"lifting" should be -- shifting --.

Signed and Sealed this

Seventeenth Day of December, 1991

Attest:

HARRY F. MANBECK, JR.

*Attesting Officer*        *Commissioner of Patents and Trademarks*